(12) United States Patent
Okuyama et al.

(10) Patent No.: US 11,924,484 B2
(45) Date of Patent: Mar. 5, 2024

(54) SYSTEM CONTROL APPARATUS AND PROTOTYPE MANIFEST FILE ACQUISITION METHOD

(71) Applicant: Nippon Telegraph and Telephone Corporation, Tokyo (JP)

(72) Inventors: Takafumi Okuyama, Musashino (JP); Hiroyuki Kitada, Musashino (JP); Xiaotian Zhao, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/778,235

(22) PCT Filed: Nov. 26, 2019

(86) PCT No.: PCT/JP2019/046239
§ 371 (c)(1),
(2) Date: May 19, 2022

(87) PCT Pub. No.: WO2021/106088
PCT Pub. Date: Jun. 3, 2021

(65) Prior Publication Data
US 2023/0020645 A1 Jan. 19, 2023

(51) Int. Cl.
| H04N 21/235 | (2011.01) |
| H04L 65/612 | (2022.01) |
| H04L 65/613 | (2022.01) |
| H04L 65/65 | (2022.01) |
| H04L 65/80 | (2022.01) |
| H04N 21/262 | (2011.01) |
| H04N 21/845 | (2011.01) |

(52) U.S. Cl.
CPC ........... *H04N 21/235* (2013.01); *H04L 65/65* (2022.05); *H04N 21/8456* (2013.01)

(58) Field of Classification Search
None
See application file for complete search history.

(56) References Cited

U.S. PATENT DOCUMENTS

| 10,771,855 | B1 * | 9/2020 | Joliveau | H04N 21/4424 |
| 2013/0007223 | A1 * | 1/2013 | Luby | H04N 21/234327 |
| | | | | 709/219 |
| 2016/0182593 | A1 * | 6/2016 | Denoual | H04N 21/2353 |
| | | | | 709/219 |
| 2021/0076088 | A1 * | 3/2021 | Sodagar | H04N 21/26258 |

OTHER PUBLICATIONS

Okuyama et al., "New Transport QoE-control Technology Enabling High-definition/High-presence Content Distribution," NTT Technical Review, 2018, 16(9):33-38.

* cited by examiner

*Primary Examiner* — Hsiungfei Peng
(74) *Attorney, Agent, or Firm* — Fish & Richardson P.C.

(57) ABSTRACT

A system control apparatus for acquiring a prototype manifest file that is a basis of a manifest file to be transmitted to a viewing client in a system for delivering video data over a network, includes: an estimation unit configured to analyze content of a prototype manifest file acquired from an origin server, to determine a next acquisition timing of the prototype manifest file; and an acquisition unit configured to acquire the prototype manifest file from the origin server, based on the next acquisition timing determined by the estimation unit.

14 Claims, 9 Drawing Sheets

| VIEWER ATTRIBUTES | IDENTIFICATION INFORMATION |
|---|---|
| RESIDENT IN TOKYO | A=1 |
| RESIDENT IN OSAKA | A=2 |
| MALE | B=1 |
| FEMALE | B=2 |

| PERIOD OF TIME | NETWORK/SYSTEM STATE | IDENTIFICATION INFORMATION | VIDEO DELIVERY SERVER | VIDEO ORGANIZATION | VIDEO QUALITY |
|---|---|---|---|---|---|
| ALL | TOKYO SERVER NORMAL & OSAKA SERVER NORMAL | A=1&B=1 | TOKYO SERVER | CONTENTS WITH CM FOR MALE | HIGH |
| ALL | TOKYO SERVER NORMAL & OSAKA SERVER NORMAL | A=1&B=2 | TOKYO SERVER | CONTENTS WITH CM FOR FEMALE | HIGH |
| ALL | TOKYO SERVER NORMAL & OSAKA SERVER NORMAL | A=2&B=1 | OSAKA SERVER | CONTENTS WITH CM FOR MALE | HIGH |
| ALL | TOKYO SERVER NORMAL & OSAKA SERVER NORMAL | A=2&B=2 | OSAKA SERVER | CONTENTS WITH CM FOR FEMALE | HIGH |
| ALL | TOKYO SERVER NORMAL & OSAKA SERVER NORMAL | NONE | TOKYO SERVER | CONTENTS WITH CM FOR GENERAL PUBLIC | LOW |
| ALL | TOKYO SERVER ABNORMAL & OSAKA SERVER NORMAL | OPTIONAL | OSAKA SERVER | CONTENTS WITH CM FOR GENERAL PUBLIC | LOW |

SYSTEM CONTROL APPARATUS AND PROTOTYPE MANIFEST FILE ACQUISITION METHOD

CROSS-REFERENCE TO RELATED APPLICATIONS

This application is a National Stage application under 35 U.S.C. § 371 of International Application No. PCT/JP2019/046239, having an International Filing Date of Nov. 26, 2019. The disclosure of the prior application is considered part of the disclosure of this application, and is incorporated in its entirety into this application.

TECHNICAL FIELD

The present invention relates to a technique for performing system control on video delivery.

BACKGROUND ART

In content providers (CP) for performing video delivery, for economical and effective video delivery, there is a demand for dynamically organizing optimal videos (contents, advertisement) and deliver them with appropriate image quality from optimal video delivery servers, according to the attributes of the viewers (viewer attributes), network/system state, and period of time.

In a video delivery system that employs a video delivery protocol for acquiring video data (segments and chunks), based on a manifest file that describes information necessary for the playback of video for the viewing client, there is a manifest control scheme (NPL 1) for realizing the delivery control required by CPs.

In the above manifest control scheme, the system control apparatus dynamically generates a manifest file to be transmitted to the viewing client in accordance with an input CP control policy and a prototype manifest file. However, because the prototype manifest file is updated as appropriate due to addition of segments or the like during delivery in live/linear streaming, in a case where the manifest control scheme is used, the system control apparatus acquires the prototype manifest file from an origin server repeatedly.

CITATION LIST

Non Patent Literature

NPL 1: T. Okuyama, K. Endo, T. Kimura, A. Matsumoto, T. Fujiwara, and Y. Kasahara, "New Transport QoE-control Technology Enabling High-definition/High-presence Content Distribution," NTT Technical Review Vol. 16 No. 9, pp. 33-38, September 2018.

SUMMARY OF THE INVENTION

Technical Problem

The origin server on which the prototype manifest file is located does not have the function of notifying the outside of the update of the prototype manifest file. Thus, the system control apparatus acquires the prototype manifest file, for example, at predetermined time intervals, regardless of whether or not the update is performed. However, this acquisition method has the following problems.

Because the time interval of the acquisition is determined regardless of the update of the prototype manifest file, repeated acquisition may occur in a situation where the prototype manifest file has not been updated. It is useless to acquire the prototype manifest file that has not been updated, and there is a problem that the system load increases.

Even though the prototype manifest file has been updated, it may take time to acquire the updated prototype manifest file. In this case, there is a problem that the generation of the manifest file based on the updated prototype manifest file may be delayed, the delivery delay may increase, and the playback on the viewing client may be interrupted.

That is, there is a problem in the techniques known in the art that the prototype manifest file cannot be acquired at the appropriate timing from the origin server.

The present invention has been made in view of the above, and an object of the present invention is to provide a technique that allows a prototype manifest file to be acquired at an appropriate timing in a system control technique for acquiring a prototype manifest file from an origin server and generating a manifest file to be transmitted to a viewing client, based on the acquired prototype manifest file.

Means for Solving the Problem

In accordance with the disclosed technique, provided is a system control apparatus for acquiring a prototype manifest file that is a basis of a manifest file to be transmitted to a viewing client in a system for delivering video data over a network, the system control apparatus including:
an estimation unit configured to analyze content of a prototype manifest file acquired from an origin server, to determine a next acquisition timing of the prototype manifest file; and
an acquisition unit configured to acquire the prototype manifest file from the origin server, based on the next acquisition timing determined by the estimation unit.

Effects of the Invention

In accordance with the disclosed technique, a technique is provided that allows a prototype manifest file to be acquired at an appropriate timing in a system control technique for acquiring a prototype manifest file from an origin server and generating a manifest file to be transmitted to a viewing client, based on the acquired prototype manifest file.

DESCRIPTION OF EMBODIMENTS

Hereinafter, embodiments of the present disclosure will be described with reference to the drawings. The embodiment to be described below is merely exemplary, and an embodiment to which the present invention is applied is not limited to the following embodiment.

Hereinafter, as an embodiment of the present invention, a technique premised on a video delivery system that employs a video delivery protocol in which a viewing client acquires video data, based on a manifest file that describes information necessary for video playback will be described. However, the present invention is applicable without limiting to such a video delivery system.

Overall Configuration of System

Figure 1:
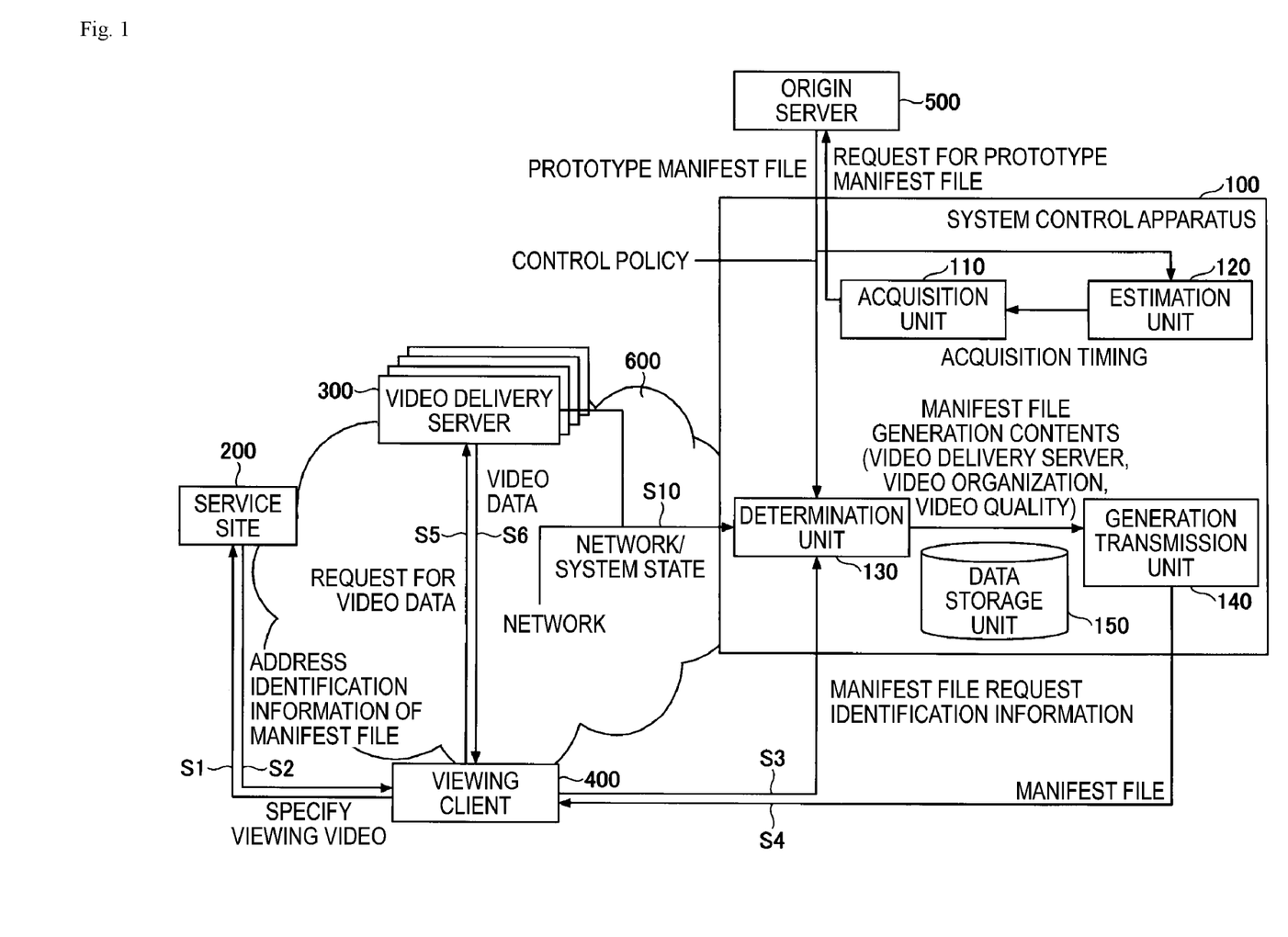
FIG. 1 is a diagram illustrating a configuration of a system according to an embodiment.

FIG. 1 illustrates an overall configuration of a video delivery system according to the present embodiment. FIG. 1 also illustrates a flow of information input/output between apparatuses. As illustrated in FIG. 1, the present video delivery system includes a system control apparatus 100, a service site 200, a video delivery server 300, a viewing client 400, and an origin server 500, which are connected to a network 600.

Various types of information such as manifest files and video data are transmitted and received via the network 600. This video delivery system is an example of a video delivery system that employs a video delivery protocol in which the viewing client 400 acquires video data, based on a manifest file that describes information necessary for the playback of video.

Note that the delivery form of video data according to the present embodiment assumes live/linear streaming, but the present invention is not limited to a specific delivery form.

The system control apparatus 100 is an apparatus that requests a prototype manifest file from the origin server 500, acquires the prototype manifest file, generates a manifest file, based on the prototype manifest file in accordance with the request for the manifest file from the viewing client 400, and transmits the generated manifest file to the viewing client 400. Details of the system control apparatus 100 will be described below.

The origin server 500 stores prototype manifest files and transmits a prototype manifest file in response to a request for a prototype manifest file from the system control apparatus 100.

The service site 200 is a website (web server) that provides a service of a video content delivery operator (CP), and has a function of enabling users to check viewable video contents.

The video delivery server 300 stores video data (segments, chunks, and the like) and transmits video data in response to a request for video data from the viewing client 400. A plurality of video delivery servers 300 are present on the network 600 (e.g., present by region). The plurality of video delivery servers 300 may include the same data of video contents, or the plurality of video delivery servers 300 may separately include data into which video contents are divided, for example.

The viewing client 400 is a terminal such as a PC, a smartphone, or a tablet which is used by a user of a video delivery service.

Example of Hardware Configuration

Each apparatus (system control apparatus 100 or the like) constituting the video delivery system according to the present embodiment can be implemented, for example, by causing a computer to execute a program describing contents of processing described in the embodiment. Note that the "computer" may be a virtual machine provided by a cloud service. In a case of using a virtual machine, the "hardware" described here is virtual hardware.

The apparatus can be implemented by executing a program corresponding to processing performed by the apparatus by using hardware resources such as a central processing unit (CPU) and a memory embedded in a computer. The program can be recorded on a computer-readable recording medium (a portable memory or the like) to be stored or distributed. The program can also be provided via a network such as the Internet or an electronic mail.

Figure 2:
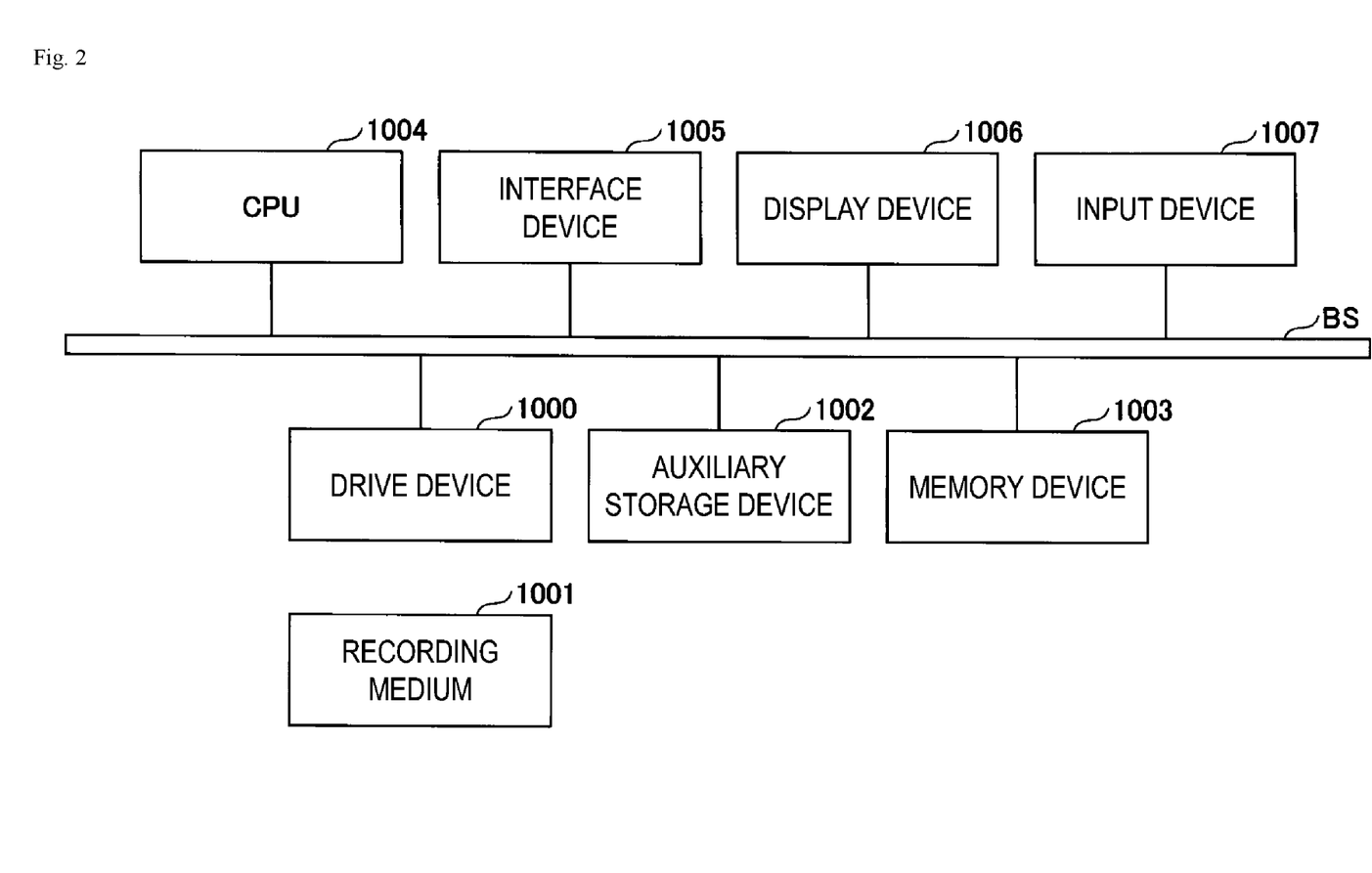
FIG. 2 is a diagram illustrating an example of a hardware configuration of the apparatus.

FIG. 2 is a diagram illustrating an example of a hardware configuration of the above-described computer according to the present embodiment. The computer in FIG. 2 includes a drive device 1000, an auxiliary storage device 1002, a memory device 1003, a CPU 1004, an interface device 1005, a display device 1006, an input device 1007, and the like which are connected to each other through a bus BS.

A program for implementing processing in the computer is provided by, for example, a recording medium 1001 such as a CD-ROM or a memory card. When the recording medium 1001 that stores a program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program in a case where an instruction to start the program is given. The CPU 1004 realizes a function related to the device in the video delivery system according to the program stored in the memory device 1003. The interface device 1005 is used as an interface for connection to a network. The display device 1006 displays a graphical user interface (GUI) or the like according to the program. The input device 1007 is constituted by a keyboard, a mouse, buttons, a touch panel, or the like, and is used to input various operation instructions.

Example of Overall Operation of System

Next, overall operation of the video delivery system according to the present embodiment will be described along with the step numbers illustrated in FIG. 1.

At S1, the viewing client 400 specifies video for the service site 200. At S2, the service site 200 returns the address of the manifest file for the specified video and identification information regarding the viewer attributes of the viewing client 400.

The identification information regarding the viewer attributes is, but is not limited to, the network address of the viewing client 400, the login state of the website that provides the video delivery service, the service membership type, the model of the terminal on which the viewing client 400 operates, the gender/age/region of use of the viewer, and the like.

Figure 3:
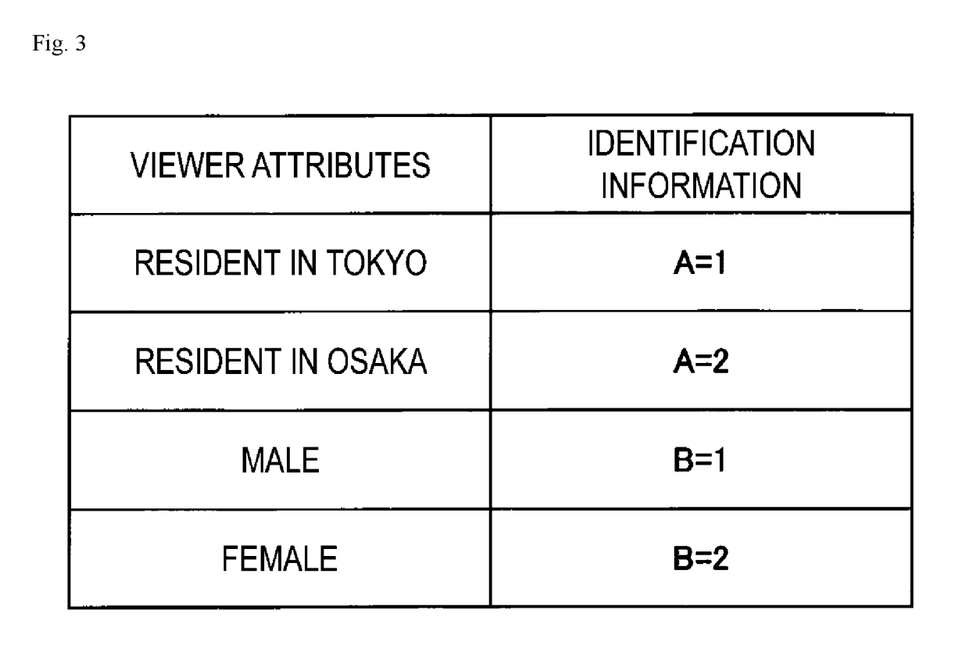
FIG. 3 is a table illustrating a correspondence relationship between viewer attributes and identification information.

The identification information may be generated and encrypted by the CP by using a correspondence relationship between the viewer attributes and the identification information acquired in advance by other means as illustrated in FIG. 3. In the example of FIG. 3, the viewer attribute of the region of use of the viewer is designated as A, and the identification information is set to A=1 in a case where the viewer lives in Tokyo and A=2 in a case where the viewer lives in Osaka. Similarly, the viewer attribute of the gender of the viewer is designated as B, and the identification information is set to B=1 for male and B=2 for female.

At S3 in FIG. 1, the viewing client 400 repeatedly transmits a manifest file request to which identification information is added for the contents, to the system control apparatus 100 while viewing the contents. The system control apparatus 100 generates (or selects) a manifest file, based on the request and transmits the manifest file to the viewing client 400 at S4. Note that instead of transmitting the manifest file itself, an identifier (URL, address, or the like) indicating the location of the manifest file may be transmitted to the viewing client 400, and the manifest file may be requested and acquired based on the information of the identifier received by the viewing client 400.

At S5, the viewing client 400 requests video data to the video delivery server 300, based on the manifest file acquired from the system control apparatus 100. At S6, the video delivery server 300 transmits the requested video data to the viewing client 400, and the viewing client plays the video data.

As indicated as S10, the video delivery server 300 and the network 600 may know the resource state and the normality (referred to as "network/system state") of the devices constituting the video delivery server 300 and the network 600, and transmit the resource state and the normality to the system control apparatus 100. The system control apparatus 100 acquires the above-described resource state and the normality at a predetermined time interval, for example.

The origin server 500 repeatedly updates the prototype manifest file and transmits the prototype manifest file in response to the request for the prototype manifest file from the system control apparatus 100.

Note that in the video delivery system according to the present embodiment, the video contents are encoded with a plurality of quality levels by an encoder, and the encoded data is divided into segments for each quality level. The data divided into segments are located on the video delivery server. The encoder generates and outputs a prototype manifest file that describes the time length of the segments, the acquisition destination (URL), and the like for each quality level, for each media (audio/video) and for each segment. Note that the origin server 500 according to the present embodiment may include an encoder, or the origin server 500 may store prototype manifest files generated by an external encoder without including an encoder.

For example, when a segment (which may be referred to as segment data or a segment file) is added, information about that segment is added and updated in the prototype manifest file. The update of the prototype manifest file according to the present embodiment mainly assumes the addition of segments, but is not limited to this.

Configuration and Operation of System Control Apparatus

As illustrated in FIG. 1, the system control apparatus 100 includes an acquisition unit 110, an estimation unit 120, a determination unit 130, a generation transmission unit 140, and a data storage unit 150. Hereinafter, operations of each unit of the system control apparatus 100 illustrated in FIG. 1 will be described in detail along with the procedures of the flowcharts in FIGS. 4, 6, and 9. Note that the configuration (functional section) of the system control apparatus 100 illustrated in FIG. 1 is merely an example.

Figure 4:
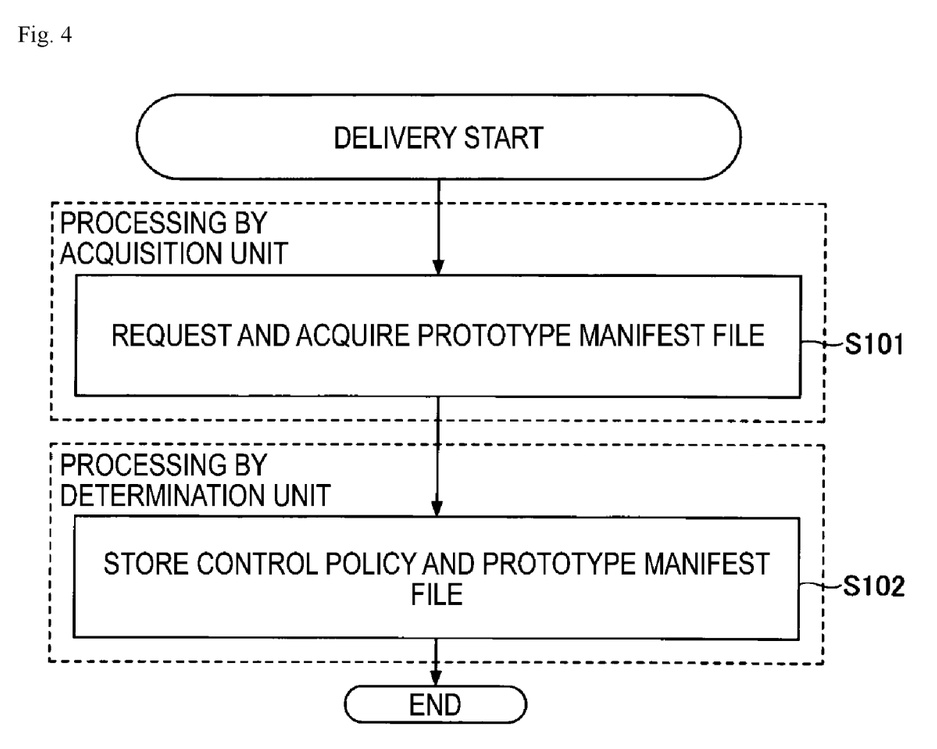
FIG. 4 is a flowchart for explaining operations related to the start of delivery of a system control apparatus.

S101 and S102 in FIG. 4

First, operations related to the start of delivery of the system control apparatus 100 will be described with reference to FIG. 4.

At S101, when delivery of a certain video is started, the acquisition unit 110 requests the prototype manifest file of the video to the origin server 500, acquires the prototype manifest file of the video from the origin server 500, and inputs the prototype manifest file into the determination unit 130 and the estimation unit 120. The control policy is input to the determination unit 130 by the CP, and at S102, the determination unit 130 stores the control policy and the prototype manifest file in the data storage unit 150.

The prototype manifest file to be acquired is assumed to be a general manifest file that is output from an encoder or the like in the city. As a means for inputting the control policy of the video to the determination unit 130, an input from an external system, a form of referencing information stored in the system, or the like can be considered, but the present invention is not limited to these.

The control policy stored in the data storage unit 150 may be a ruled table or may be a template of predetermined processing procedures (logics) according to the control policy.

Figure 5:
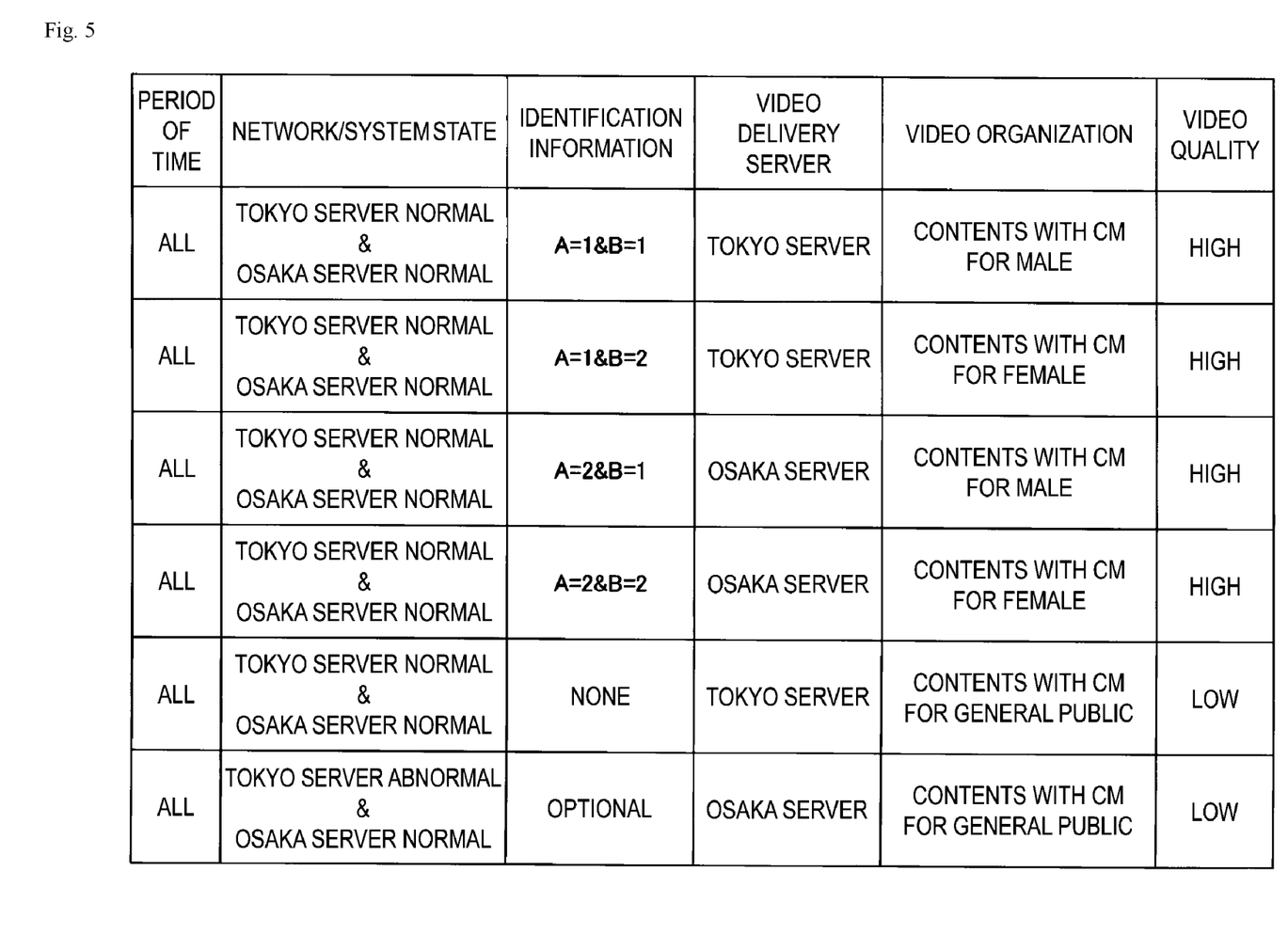
FIG. 5 is a table illustrating an example of rules of a control policy.

FIG. 5 illustrates an example of a ruled table of control policy. The table illustrated in FIG. 5 stores video delivery servers, the video organization, the video quality for the network/system state, and the identification information (viewer attributes) by periods of time.

For example, in a case where the network/system state is "Tokyo server normal & Osaka server normal" and the identification information added to the received manifest file request is "A=1 & B=1" (resident in Tokyo, male), the determination unit 130 determines the video delivery server=Tokyo server, video organization=contents with CM for male, and video quality=high as the manifest file generation contents, from the table illustrated in FIG. 5. Note that FIG. 5 is an example. As a ruled table of the control policy, a table may be used that has any one or two of the period of time, the state of the system, and the identification information, and information necessary for acquiring the video data.

Figure 6:
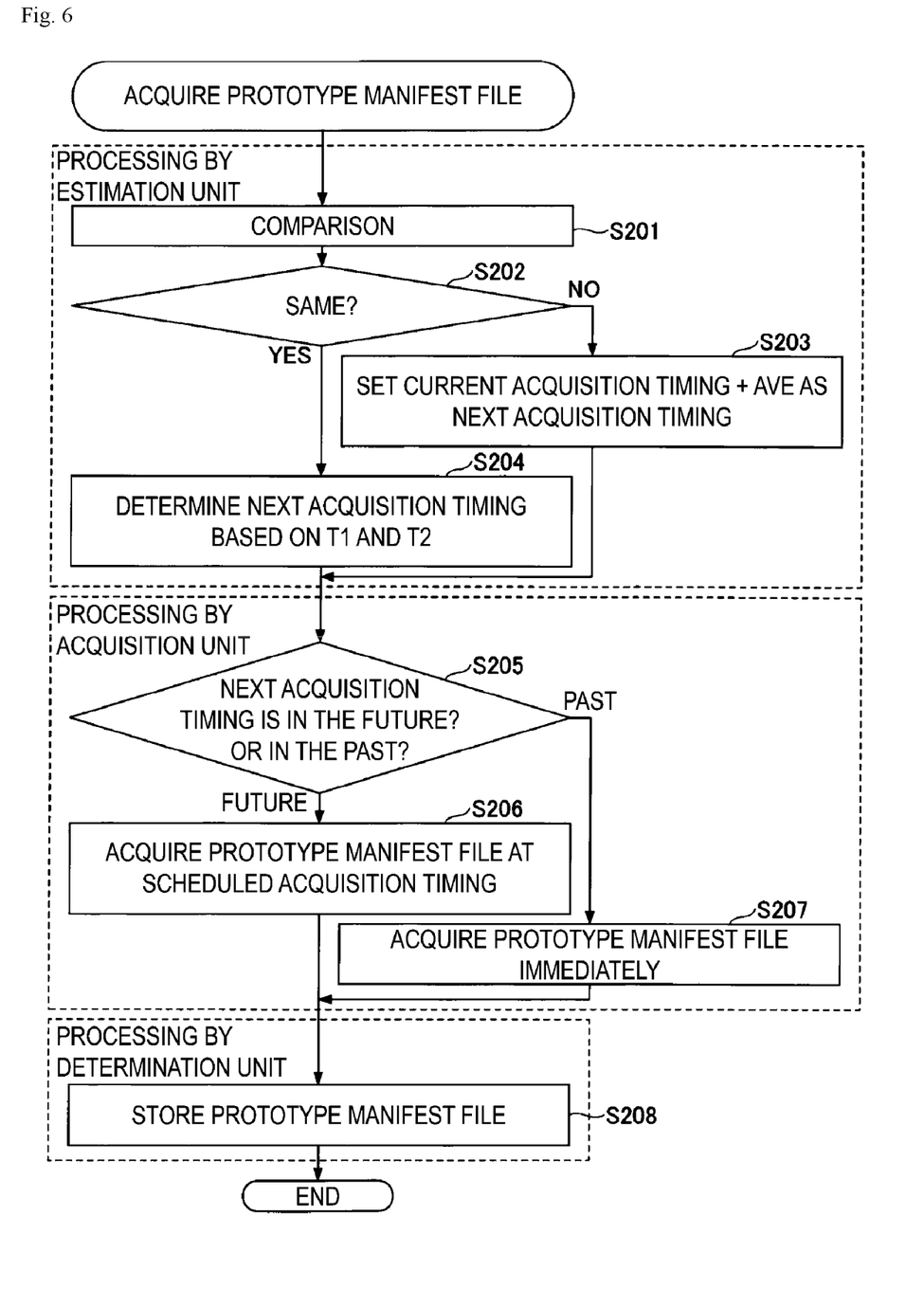
FIG. 6 is a flowchart for explaining operations related to repeated acquisition of a prototype manifest file of the system control apparatus.

S201 to S204 in FIG. 6

Next, with reference to FIG. 6, operations related to the repeated acquisition of the prototype manifest file by the system control apparatus 100 will be described.

In the following description, the prototype manifest file acquired most recently by the acquisition unit 110 will be referred to as the "prototype manifest file acquired at the current acquisition timing". The prototype manifest file acquired at the acquisition timing immediately before the current acquisition timing is referred to as the "prototype manifest file acquired at the previous acquisition timing". The acquisition timing next to the current acquisition timing is referred to as the next acquisition timing. The acquisition timing is the time at which the acquisition request is transmitted to the origin server 500. For example, the prototype manifest file acquired at the current acquisition timing is, more specifically, the prototype manifest file acquired based on the request transmitted at the current acquisition timing.

The estimation unit 120 analyzes the acquired prototype manifest file, estimates the update timing, determines the next acquisition timing, and informs the acquisition unit 110 of the next acquisition timing.

More specifically, at S201, the estimation unit 120 compares the prototype manifest file acquired at the current acquisition timing with the prototype manifest file acquired at the previous acquisition timing, to determine whether they have the same contents. Note that the estimation unit 120 may read the prototype manifest file acquired at the previous acquisition timing, from the data storage unit 150, or may use the prototype manifest file temporarily held within the estimation unit 120.

At S202, in a case where the estimation unit 120 determines that the prototype manifest file acquired at the current acquisition timing and the prototype manifest file acquired at the previous acquisition timing are different from each other, the processing proceeds to S203. At S203, the next acquisition timing is determined by the following method.

The estimation unit 120 extracts information regarding the time length of the segments in the prototype manifest file (playback time length when played) acquired at the current acquisition timing, and calculates a statistical value of some or all of the time lengths of the segments. For example, in a case where there is information for 10 segments in the prototype manifest file, the estimation unit 120 calculates a statistical value of the time length for all 10 segments or calculates a statistical value of the time length for some of 10 segments (e.g., five segments).

The statistical value here is, for example, an average value (referred to as AVE). However, using an average value as a statistical value is an example, and, in addition to the average value, for example, a median value, a mode, and the like may be used. Here, the average value (AVE) is used.

The estimation unit 120 sets the timing of the time when the AVE elapses from the time of the current acquisition timing as the next acquisition timing.

Figure 7:
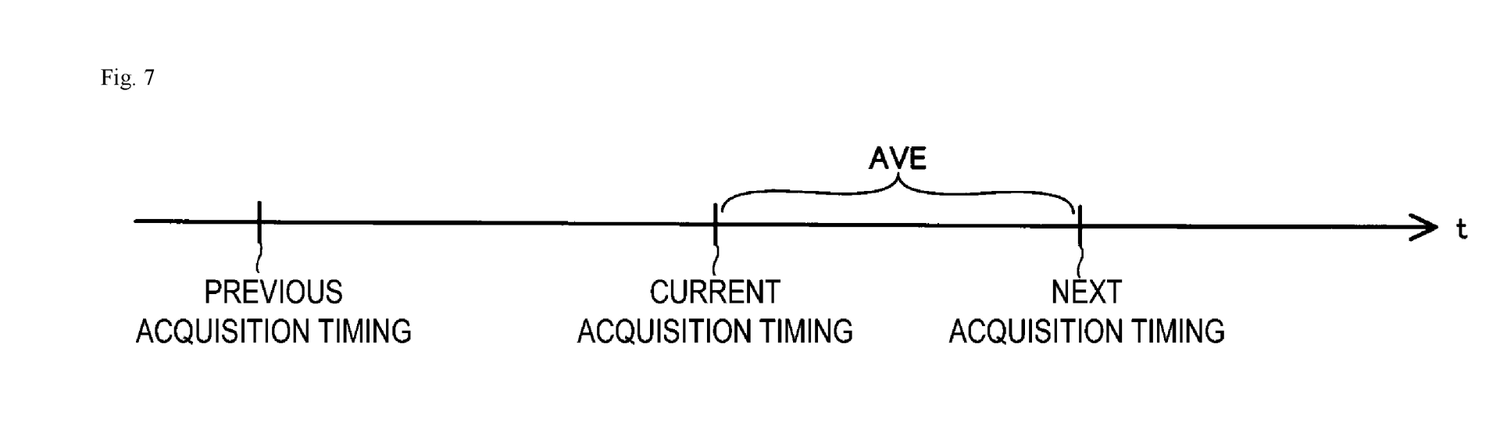
FIG. 7 is a diagram illustrating an example of a next acquisition timing in a case where a prototype manifest file acquired at a current acquisition timing and a prototype manifest file acquired at a previous acquisition timing are different from each other.

FIG. 7 illustrates an example of determining the next acquisition timing at S203. As illustrated in FIG. 7, the "current acquisition timing+AVE" is determined as the next acquisition timing.

In the repeated acquisition processing of the prototype manifest file according to the present embodiment, in a case where the prototype manifest file acquired at the current acquisition timing is different from the prototype manifest file acquired at the previous acquisition timing (that is, in a case where the prototype manifest file is updated), it is likely that an update has been made shortly before the current acquisition timing. In live streaming, linear streaming, etc., it is considered that the update of the prototype manifest file related to the addition of segments is performed for each time length of the segments over time. Thus, it is likely that the next update is made the AVE (average segment length) after the current acquisition timing. Thus, by acquiring the prototype manifest file at the next acquisition timing of FIG. 7, it is likely that a prototype manifest file that has been updated a short time ago can be acquired.

At S202 in FIG. 6, in a case where the estimation unit 120 determines that the prototype manifest file acquired at the current acquisition timing and the prototype manifest file acquired at the previous acquisition timing are the same, the processing proceeds to S204. At S204, the next acquisition timing is determined by the following method.

The estimation unit 120 extracts information regarding the time length of the segments in the prototype manifest file of the previous acquisition timing or the current acquisition timing, and calculates a statistical value (referred to as a first statistical value) for some or all of the time lengths of the segments. For example, in a case where there is information for 10 segments in the prototype manifest file, the estimation unit 120 calculates a statistical value of the time length for all 10 segments or calculates a first statistical value of the time length for some of the 10 segments (e.g., five segments).

The first statistical value is a statistical value whose value is larger than that of the statistical value (average value or the like) calculated at S203, and is, for example, a maximum value (referred to as MAX). However, using the maximum value as the first statistical value is an example, and in addition to the maximum value, for example, an X percentile value (X is 90, for example) or the like may be used. Here, the maximum value (MAX) is used as the first statistical value.

The estimation unit 120 sets the timing of the time when the MAX elapses from the time of the previous acquisition timing, as an acquisition timing candidate T1.

The estimation unit 120 calculates a second statistical value for some or all of the time lengths of the segments in the prototype manifest file. The second statistical value is a statistical value whose value is smaller than that of the first statistical value, and is, for example, an average value (referred to as AVE). However, using an average value as a second statistical value is an example, and, in addition to the average value, for example, a median value, a mode, or the like may be used. Here, the average value (AVE) is used as the second statistical value.

The estimation unit 120 sets the timing of the time when the AVE elapses from the time of the current acquisition timing as an acquisition timing candidate T2. The estimation unit 120 compares T1 and T2, and determines the acquisition timing candidate earlier in time as the next acquisition timing.

Figure 8:
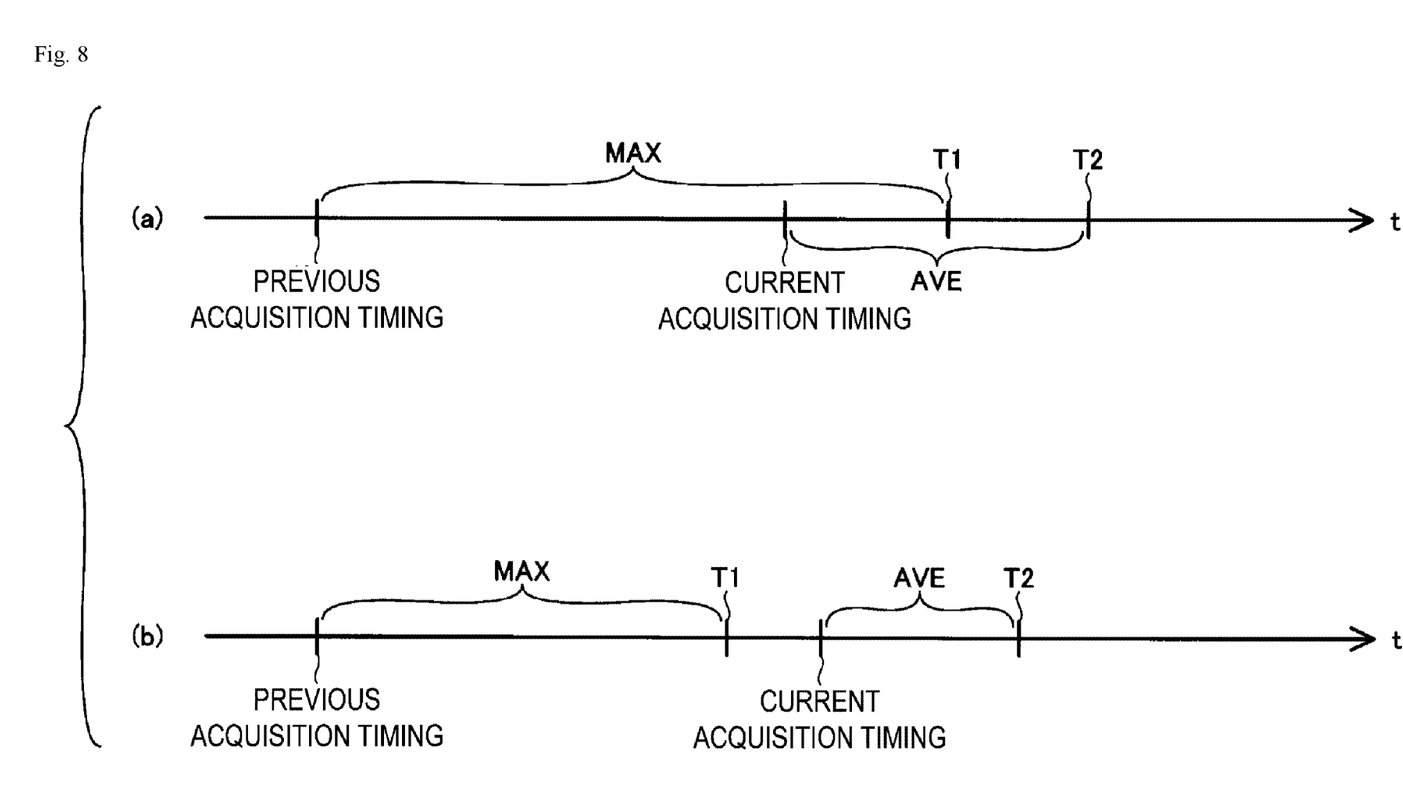
FIG. 8 is a diagram illustrating an example of a next acquisition timing in a case where a prototype manifest file acquired at a current acquisition timing and a prototype manifest file acquired at a previous acquisition timing are the same.

FIG. 8 illustrates an example of determining the next acquisition timing at S204. The case illustrated in FIG. 8(a) is a case in which both T1 and T2 are times in the future with respect to the current acquisition timing. In the case of FIG. 8(a), because T1 is earlier than T2, T2 is determined as the next acquisition timing.

The case illustrated in FIG. 8(b) is a case in which T1 is a time in the past with respect to the current acquisition timing, and T2 is a time in the future with respect to the current acquisition timing. In this case as well, T1 is determined as the next acquisition timing. However, as described below, in the case of FIG. 8(b), the prototype manifest file is acquired immediately after the prototype manifest file is acquired at the current acquisition timing.

At S204 (in a case where the prototype manifest file acquired at the current acquisition timing and the prototype manifest file acquired at the previous acquisition timing are the same), the prototype manifest file has not yet been updated at the current acquisition timing. In this case, for example, it is assumed that no update has been made, for example, because of the delivery of segments long in time length. It is likely that an update is made when the first statistical value (MAX or the like) elapses from the previous acquisition timing, Thus, the first statistical value (MAX or the like) is used at S204. However, in a case where the first statistical value (MAX or the like) is very long, it is likely that an update is made long before the timing when the first statistical value (MAX or the like) elapses from the previous acquisition timing. Thus, at S204, the second statistical value (AVE or the like) is also used to calculate T1 based on the first statistical value and T2 based on the second statistical value, and the timing earlier is set as the next acquisition timing.

Both the statistical value (AVE or the like) of S203 described above and the second statistical value (AVE or the like) of S204 may be used temporarily storing the results calculated at the time of acquiring the prototype manifest file at the previous acquisition timing.

Regarding the first statistical value (MAX or the like) of S204, the value corresponding to the maximum value of the time length of the segments may be referred to without calculation and used as the first statistical value. The value corresponding to the maximum value of the time length of the segments may be held in advance in the data storage unit 150, and the estimation unit 120 may read the value, or the estimation unit 120 may acquire the value from the origin server 500.

At both S203 and S204, statistical processing such as excluding outliers may be performed in the calculation of the statistical values. In a case where the segments are divided among a plurality of media (for example, video data and audio data) in the prototype manifest file and the plurality of media have different pieces of time length information, the time length information of any one of the media may be used.

S205 to S208 in FIG. 6

Next, the acquisition processing based on the next acquisition timing determined by the estimation unit 120 at S201 to S204 will be described.

At S205, the acquisition unit 110 checks whether the next acquisition timing is in the future (scheduled) or in the past (the scheduled time has already passed) with respect to the present time. The present time is the time at which the determination of S205 is made, and is the time immediately after the determination of the next acquisition timing is made.

If the next acquisition timing is in the future, the process proceeds to S206, and the acquisition unit 110 requests the prototype manifest file to the origin server 500 at the scheduled next acquisition timing. If the next acquisition timing is in the past, the process proceeds to S207, and the acquisition unit 110 immediately requests the prototype manifest file to the origin server 500. At S208, the acquisition unit 110 inputs the acquired prototype manifest file to the determination unit 130 and the estimation unit 120, and the determination unit 130 stores the prototype manifest file in the data storage unit 150. The estimation unit 120 performs the processes of S201 to S204.

Figure 9:
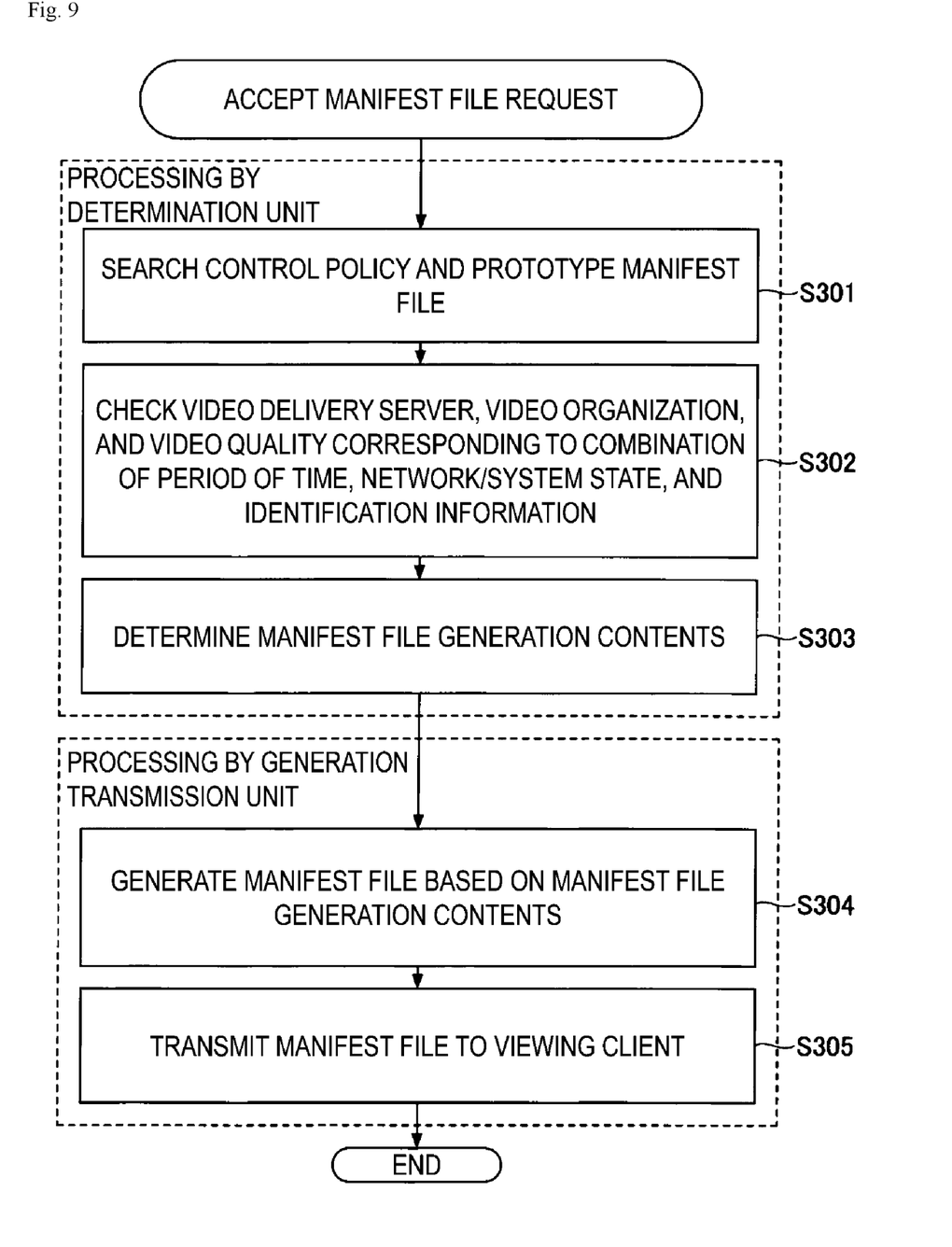
FIG. 9 is a flowchart for explaining operations related to reception of a request for a manifest file of the system control apparatus.

S301 to S305 in FIG. 9

Next, operations related to reception of a request for the manifest file of the system control apparatus 100 will be described with reference to FIG. 9.

When the determination unit 130 receives the request for the manifest file to which the identification information is added from the viewing client 400, the determination unit 130 searches for the control policy stored in the data storage unit 150 and the latest prototype manifest file at S301, and checks the video delivery server, the video organization, and the video quality corresponding to the combination of the period of time, the network/system state, and the identification information at S302. Note that the data storage unit 150 stores prototype manifest files of various types of contents. The above "search for the prototype manifest file" is to search out the prototype manifest file for contents that matches the request from the viewing client 400.

In a case where the identification information is encrypted, the identification information is decrypted and checked. The period of time is, for example, a period of time to which the time when the request for the manifest file is received belongs. Then, at S303, the determination unit 130 determines the video delivery server, the video organization, and the video quality corresponding to the combination of the period of time, the network/system state, and the identification information, as the video delivery server, the video organization, and the video quality that are the manifest file generation contents. At the same time, the prototype manifest file searched out is determined as the manifest file generation contents.

Note that the use of the combination of the period of time, the network/system state, and the identification information is an example. For example, at least one of the three pieces of information, the period of time, the network/system state, and the identification information, may be used to determine the video delivery server, the video organization, and the video quality. The video delivery server, the video organization, and the video quality are examples of information necessary for acquiring video data. Regarding the "network/system state", the "network/system state" may be paraphrased as the state of the system, given that the network is also included in the system. For example, one or two of the period of time, network/system state, and the identification information may be used to search the control policy and the prototype manifest file, and the acquired information may be determined as the manifest file generation contents.

At S304, the generation transmission unit 140 generates the manifest file, based on the manifest file generation contents determined by the determination unit 130. At S305, the generated manifest file is transmitted to the viewing client 400.

Note that instead of transmitting the manifest file itself, an identifier (URL, address, or the like) indicating the location of the manifest file may be transmitted to the viewing client 400, and the manifest file may be requested and acquired based on the information of the identifier received by the viewing client 400. Generating the manifest file means converting the determined manifest file generation contents into a file in a format defined by a predetermined video delivery protocol.

By storing the generated manifest file in the data storage unit 150, the manifest file may be read from the data storage unit 150 and used in a case where the manifest file needs to be generated with the same contents later.

Effects of Embodiment and Supplement, Etc

As described above, according to the technique according to the present embodiment, the system control apparatus 100 analyzes the acquired prototype manifest file, and estimates the update timing to determine the next acquisition timing, so the next acquisition can be performed at the appropriate time.

As a result, it is possible to avoid an increase in load due to repeated acquisition of the prototype manifest file that is not updated. It is also possible to prevent an increase in delivery delay associated with a delay in manifest file generation due to the inability to quickly acquire the updated prototype manifest file, and a playback interruption on the viewing client.

This specification discloses at least the system control apparatus and the method for acquiring a prototype manifest file described in each of the following items.

Item 1

A system control apparatus for acquiring a prototype manifest file that is a basis of a manifest file to be transmitted to a viewing client in a system for delivering video data over a network, the system control apparatus including:

an estimation unit configured to analyze content of a prototype manifest file acquired from an origin server, to determine a next acquisition timing of the prototype manifest file; and an acquisition unit configured to acquire the prototype manifest file from the origin server, based on the next acquisition timing determined by the estimation unit.

Item 2

The system control apparatus according to item 1, wherein the estimation unit compares a prototype manifest file acquired at a current acquisition timing to a prototype manifest file acquired at a previous acquisition timing, and changes processing according to whether or not the prototype manifest files have the same content.

Item 3

The system control apparatus according to item 2, wherein, in a case where the estimation unit determines that the prototype manifest file acquired at the current acquisition timing and the prototype manifest file acquired at the previous acquisition timing are different from each other, the estimation unit calculates a statistical value for a time length of all or some segments of all segments in the prototype manifest file acquired at the current acquisition timing, and determines a timing of a time when the statistical value elapses from the current acquisition timing as the next acquisition timing.

Item 4

The system control apparatus according to item 2 or 3, wherein the estimation unit in a case where the estimation unit determines that the prototype manifest file acquired at the current acquisition timing and the prototype manifest file acquired at the previous acquisition timing are the same, calculates a first value that is a statistical value for a time length of all or some segments of all segments in the prototype manifest file acquired, and determines a timing of a time when the first value elapses from the previous acquisition timing as a first acquisition timing candidate, calculates a second value that is a statistical value for a time length of all or some segments of the all segments, and determines a timing of a time when the second value elapses from the current acquisition timing as a second acquisition timing candidate, and compares the first acquisition timing candidate and the second acquisition timing candidate to determine an acquisition timing candidate earlier in time as the next acquisition timing.

Item 5

The system control apparatus according to item 2 or 3, wherein the estimation unit in a case where the estimation unit determines that the prototype manifest file acquired at the current acquisition timing and the prototype manifest file acquired at the previous acquisition timing are the same, acquires a value corresponding to a maximum value of a time length of segments as a first value, and determines a timing of a time when the first value elapses from the previous acquisition timing as a first acquisition timing candidate, calculates a second value that is a statistical value for a time length of all or some segments of all segments in the prototype manifest file acquired, and determines a timing of a time when the second value elapses from the current acquisition timing as a second acquisition timing candidate, and compares the first acquisition timing candidate and the second acquisition timing candidate to determine an acquisition timing candidate earlier in time as the next acquisition timing.

Item 6

The system control apparatus according to any one of items 3 to 5, wherein both the statistical value in a case where the prototype manifest file acquired at the current acquisition timing and the prototype manifest file acquired at the previous acquisition timing are different from each other, and the second value are average values for a time length of all or some segments of the all segments in the prototype manifest file, and the first value as a statistical value is a maximum value for a time length of all or some segments of the all segments in the prototype manifest file.

Item 7

The system control apparatus according to any one of items 1 to 6, wherein the acquisition unit checks whether the next acquisition timing is in future or in past with respect to a present time, and requests the prototype manifest file to the origin server at the next acquisition timing if the next acquisition timing is in the future and requests the prototype manifest file to the origin server immediately if the next acquisition timing is in the past.

Item 8

A method for acquiring a prototype manifest file performed by a system control apparatus for acquiring the prototype manifest file that is a basis of a manifest file to be transmitted to a viewing client in a system for delivering video data over a network, the method comprising:

analyzing content of a prototype manifest file acquired from an origin server to determine a next acquisition timing of a prototype manifest file; and acquiring the prototype manifest file from the origin server, based on the next acquisition timing determined by the determining.

Although the present embodiment has been described above, the present invention is not limited to such a specific embodiment, and various modifications and changes can be made within the scope of the gist of the present invention described in the claims.

REFERENCE SIGNS LIST

100 System control apparatus
110 Acquisition unit
120 Estimation unit
130 Determination unit
140 Generation transmission unit
150 Data storage unit
200 Service site
300 Video delivery server
400 Viewing client
500 Origin Server
600 Network
1000 Drive device
1001 Recording medium
1002 Auxiliary storage device
1003 Memory device
1004 CPU
1005 Interface device
1006 Display device
1007 Input device

The invention claimed is:

1. A system control apparatus for acquiring a prototype manifest file that is a basis of a manifest file to be transmitted to a viewing client in a system for delivering video data over a network, the system control apparatus comprising:

an estimation unit, including one or more processors, configured to analyze content of a prototype manifest file acquired from an origin server, to determine a next acquisition timing of the prototype manifest file;

an acquisition unit, including one or more processors, configured to acquire the prototype manifest file from the origin server, based on the next acquisition timing determined by the estimation unit;

wherein the estimation unit is configured to compare the prototype manifest file acquired at a current acquisition timing to a protype manifest file acquired at a previous acquisition timing, and change processing according to whether or not the protype manifest files have the same content; and in response to the estimation unit determining that the prototype manifest file acquired at the current acquisition timing and the prototype manifest file acquired at the previous acquisition timing are different from each other, the estimation unit is configured to calculate a statistical value for a time length of all or some segments of all segments in the protype manifest file acquired at the current acquisition timing, and determine a timing of a time when the statistical value elapses from the current acquisition timing as the next acquisition timing.

2. The system control apparatus according to claim 1, wherein the estimation unit determines that the prototype manifest file acquired at the current acquisition timing and the prototype manifest file acquired at the previous acquisition timing are the same, the estimation unit is configured to:

calculate a first value that is a statistical value for a time length of all or some segments of all segments in the prototype manifest file acquired, and determine a timing of a time when the first value elapses from the previous acquisition timing as a first acquisition timing candidate, calculate a second value that is a statistical value for a time length of all or some segments of the all segments, and determine a timing of a time when the second value elapses from the current acquisition timing as a second acquisition timing candidate, and compare the first acquisition timing candidate and the second acquisition timing candidate to determine an acquisition timing candidate earlier in time as the next acquisition timing.

3. The system control apparatus according to claim 1, wherein the estimation unit determines that the prototype manifest file acquired at the current acquisition timing and the prototype manifest file acquired at the previous acquisition timing are the same, is configured to:

acquire a value corresponding to a maximum value of a time length of segments as a first value, and determines a timing of a time when the first value elapses from the previous acquisition timing as a first acquisition timing candidate, calculate a second value that is a statistical value for a time length of all or some segments of all segments in the prototype manifest file acquired, and determine a timing of a time when the second value elapses from the current acquisition timing as a second acquisition timing candidate, and compare the first acquisition timing candidate and the second acquisition timing candidate to determine an acquisition timing candidate earlier in time as the next acquisition timing.

4. The system control apparatus according to claim 3, wherein both the statistical value in a case where the prototype manifest file acquired at the current acquisition timing and the prototype manifest file acquired at the previous acquisition timing are different from each other, and the second value are average values for a time length of all or some segments of the all segments in the prototype manifest file, and the first value as a statistical value is a maximum value for a time length of all or some segments of the all segments in the prototype manifest file.

5. The system control apparatus according to claim 1, wherein the acquisition unit is configured to check whether the next acquisition timing is in future or in past with respect to a present time, and request the prototype manifest file to the origin server at the next acquisition timing if the next acquisition timing is in the future and request the prototype manifest file to the origin server immediately if the next acquisition timing is in the past.

6. A method for acquiring a prototype manifest file performed by a system control apparatus for acquiring the prototype manifest file that is a basis of a manifest file to be transmitted to a viewing client in a system for delivering video data over a network, the method comprising:

analyzing content of a prototype manifest file acquired from an origin server to determine a next acquisition timing of a prototype manifest file;

acquiring the prototype manifest file from the origin server, based on the next acquisition timing;

comparing the prototype manifest file acquired at a current acquisition timing to a protype manifest file acquired at a previous acquisition timing;

changing processing according to whether or not the protype manifest files have the same content;

in response to determining that the prototype manifest file acquired at the current acquisition timing and the prototype manifest file acquired at the previous acquisition timing are different from each other:

calculating a statistical value for a time length of all or some segments of all segments in the protype manifest file acquired at the current acquisition timing; and determining a timing of a time when the statistical value elapses from the current acquisition timing as the next acquisition timing.

7. The method according to claim 6, further comprising:
wherein determining that the prototype manifest file acquired at the current acquisition timing and the prototype manifest file acquired at the previous acquisition timing are the same comprises:

calculating a first value that is a statistical value for a time length of all or some segments of all segments in the prototype manifest file acquired;

determining a timing of a time when the first value elapses from the previous acquisition timing as a first acquisition timing candidate;

calculating a second value that is a statistical value for a time length of all or some segments of the all segments;

determining a timing of a time when the second value elapses from the current acquisition timing as a second acquisition timing candidate; and comparing the first acquisition timing candidate and the second acquisition timing candidate to determine an acquisition timing candidate earlier in time as the next acquisition timing.

8. The method according to claim 6, further comprising:
wherein determining that the prototype manifest file acquired at the current acquisition timing and the prototype manifest file acquired at the previous acquisition timing are the same comprises:
acquiring a value corresponding to a maximum value of a time length of segments as a first value;
determining a timing of a time when the first value elapses from the previous acquisition timing as a first acquisition timing candidate;
calculating a second value that is a statistical value for a time length of all or some segments of all segments in the prototype manifest file acquired,
determining a timing of a time when the second value elapses from the current acquisition timing as a second acquisition timing candidate; and
comparing the first acquisition timing candidate and the second acquisition timing candidate to determine an acquisition timing candidate earlier in time as the next acquisition timing.

9. The method according to claim 8, wherein both the statistical value in a case where the prototype manifest file acquired at the current acquisition timing and the prototype manifest file acquired at the previous acquisition timing are different from each other, and the second value are average values for a time length of all or some segments of the all segments in the prototype manifest file, and
the first value as a statistical value is a maximum value for a time length of all or some segments of the all segments in the prototype manifest file.

10. The method according to claim 6, further comprising:
checking whether the next acquisition timing is in future or in past with respect to a present time;
requesting the prototype manifest file to the origin server at the next acquisition timing if the next acquisition timing is in the future; and
requesting the prototype manifest file to the origin server immediately if the next acquisition timing is in the past.

11. A non-transitory computer readable medium storing one or more instructions causing a computer to execute:
acquiring, by a system control apparatus, a prototype manifest file that is a basis of a manifest file to be transmitted to a viewing client in a system for delivering video data over a network, comprising:
analyzing content of a prototype manifest file acquired from an origin server to determine a next acquisition timing of a prototype manifest file; and
acquiring the prototype manifest file from the origin server, based on the next acquisition timing;
comparing the prototype manifest file acquired at a current acquisition timing to a protype manifest file acquired at a previous acquisition timing;
changing processing according to whether or not the protype manifest files have the same content;
in response to determining that the prototype manifest file acquired at the current acquisition timing and the prototype manifest file acquired at the previous acquisition timing are different from each other:
calculating a statistical value for a time length of all or some segments of all segments in the protype manifest file acquired at the current acquisition timing; and
determining a timing of a time when the statistical value elapses from the current acquisition timing as the next acquisition timing.

12. The non-transitory computer readable medium according to claim 11, further comprising:
wherein determining that the prototype manifest file acquired at the current acquisition timing and the prototype manifest file acquired at the previous acquisition timing are the same comprises:
calculating a first value that is a statistical value for a time length of all or some segments of all segments in the prototype manifest file acquired;
determining a timing of a time when the first value elapses from the previous acquisition timing as a first acquisition timing candidate;
calculating a second value that is a statistical value for a time length of all or some segments of the all segments;
determining a timing of a time when the second value elapses from the current acquisition timing as a second acquisition timing candidate; and
comparing the first acquisition timing candidate and the second acquisition timing candidate to determine an acquisition timing candidate earlier in time as the next acquisition timing.

13. The non-transitory computer readable medium according to claim 11, further comprising:
wherein determining that the prototype manifest file acquired at the current acquisition timing and the prototype manifest file acquired at the previous acquisition timing are the same comprises:
acquiring a value corresponding to a maximum value of a time length of segments as a first value;
determining a timing of a time when the first value elapses from the previous acquisition timing as a first acquisition timing candidate;
calculating a second value that is a statistical value for a time length of all or some segments of all segments in the prototype manifest file acquired,
determining a timing of a time when the second value elapses from the current acquisition timing as a second acquisition timing candidate; and
comparing the first acquisition timing candidate and the second acquisition timing candidate to determine an acquisition timing candidate earlier in time as the next acquisition timing.

14. The non-transitory computer readable medium according to claim 13, wherein both the statistical value in a case where the prototype manifest file acquired at the current acquisition timing and the prototype manifest file acquired at the previous acquisition timing are different from each other, and the second value are average values for a time length of all or some segments of the all segments in the prototype manifest file, and
the first value as a statistical value is a maximum value for a time length of all or some segments of the all segments in the prototype manifest file.

* * * * *